(12) United States Patent
Yamaura

(10) Patent No.: US 7,659,908 B2
(45) Date of Patent: *Feb. 9, 2010

(54) IMAGE PROCESSING CIRCUIT, COMBINED IMAGE PROCESSING CIRCUIT, AND IMAGE FORMING APPARATUS

(75) Inventor: Shinichi Yamaura, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/634,459

(22) Filed: Dec. 5, 2006

(65) Prior Publication Data

US 2007/0080969 A1   Apr. 12, 2007

Related U.S. Application Data

(63) Continuation of application No. 10/371,631, filed on Feb. 20, 2003, now Pat. No. 7,170,522.

(30) Foreign Application Priority Data

Feb. 28, 2002   (JP) .............................. 2002-053734

(51) Int. Cl.
*G09G 5/36* (2006.01)
*G06F 15/16* (2006.01)
*G06T 1/60* (2006.01)

(52) U.S. Cl. ..................... 345/560; 345/502; 345/530

(58) Field of Classification Search ................. 345/560, 345/530, 501, 502, 505, 506, 611, 660; 358/1.16, 358/400

See application file for complete search history.

(56) References Cited

U.S. PATENT DOCUMENTS

| 5,161,229 A | 11/1992 | Yasui et al. |
| 5,301,338 A | 4/1994 | Yamaura et al. |
| 5,473,444 A | 12/1995 | Sakano et al. |
| 5,511,173 A | 4/1996 | Yamaura et al. |
| 5,594,890 A | 1/1997 | Yamaura et al. |
| 5,596,761 A | 1/1997 | Yoshioka et al. |
| 5,606,709 A | 2/1997 | Yoshioka et al. |

(Continued)

FOREIGN PATENT DOCUMENTS

JP   06149994   5/1994

(Continued)

OTHER PUBLICATIONS

U.S. Appl. No. 09/658,860, filed Sep. 8, 2000.

(Continued)

*Primary Examiner*—Joni Hsu
*Assistant Examiner*—Kee M Tung
(74) *Attorney, Agent, or Firm*—Cooper & Dunham, LLP

(57) ABSTRACT

An image processing circuit comprising a plurality of line buffers is provided. Each line buffer stores pixel data of a plurality of pixels as line data, the plurality of pixels configuring a single image line of an image. A first image processing part performs a first image processing task on original image data provided from the exterior by using the line data stored in at least one of the line buffers, and provides processed image data. A second image processing part performs a second image processing task on the processed image data provided from the first image processing part by using the line data stored in at least one of the line buffers, and provides processed image data. A line buffer selector selectively connects the first image processing part and the second image processing part to any number of line buffers. An output path selector selects one of an output path that skips the second image processing task and an output path that performs the second image processing task.

14 Claims, 7 Drawing Sheets

U.S. PATENT DOCUMENTS

| | | | |
|---|---|---|---|
| 5,630,158 A | 5/1997 | Hara et al. | |
| 5,696,957 A | 12/1997 | Yamaura et al. | |
| 5,715,336 A * | 2/1998 | Tanaka | 382/301 |
| 5,938,758 A | 8/1999 | Katayama et al. | |
| 6,084,686 A * | 7/2000 | Ushida | 358/1.16 |
| 6,091,859 A * | 7/2000 | Sonobe et al. | 382/298 |
| 6,175,890 B1 | 1/2001 | Yamaura | |
| 6,189,086 B1 | 2/2001 | Yamaura | |
| 6,266,756 B1 | 7/2001 | Hara et al. | |
| 6,662,295 B2 | 12/2003 | Yamaura | |
| 6,853,385 B1 * | 2/2005 | MacInnis et al. | 345/629 |
| 2001/0008563 A1 | 7/2001 | Yamaura et al. | |
| 2002/0105676 A1 * | 8/2002 | Fujiwara et al. | 358/1.15 |

FOREIGN PATENT DOCUMENTS

| | | |
|---|---|---|
| JP | 07044696 | 2/1995 |
| JP | 7-123337 | 5/1995 |
| JP | 7-271958 | 10/1995 |
| JP | 10340340 | 12/1998 |
| JP | 2000-312327 | 11/2000 |
| JP | 2001-283211 | 10/2001 |

OTHER PUBLICATIONS

Mar. 4, 2008 Japanese official action in connection with corresponding Japanese application No. 2002-053734.

* cited by examiner

| D00 | D01 | D02 |
|---|---|---|
| D10 | D11 | D12 |
| D20 | D21 | D22 |

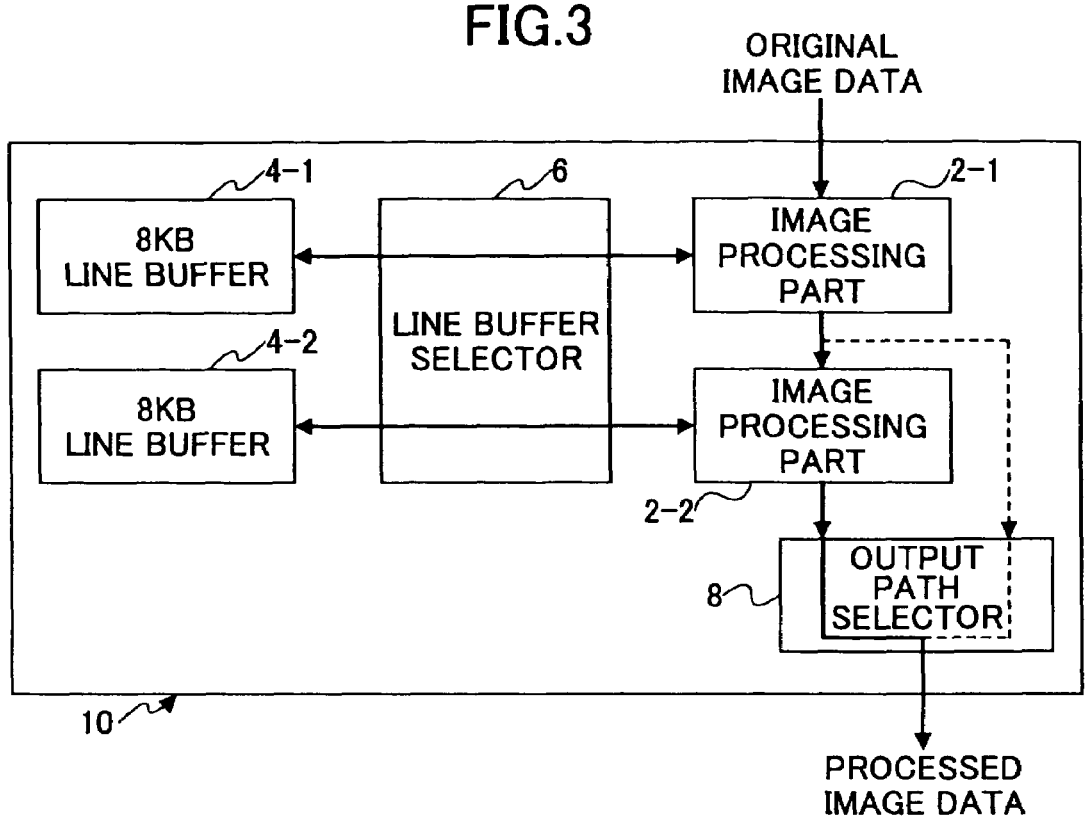
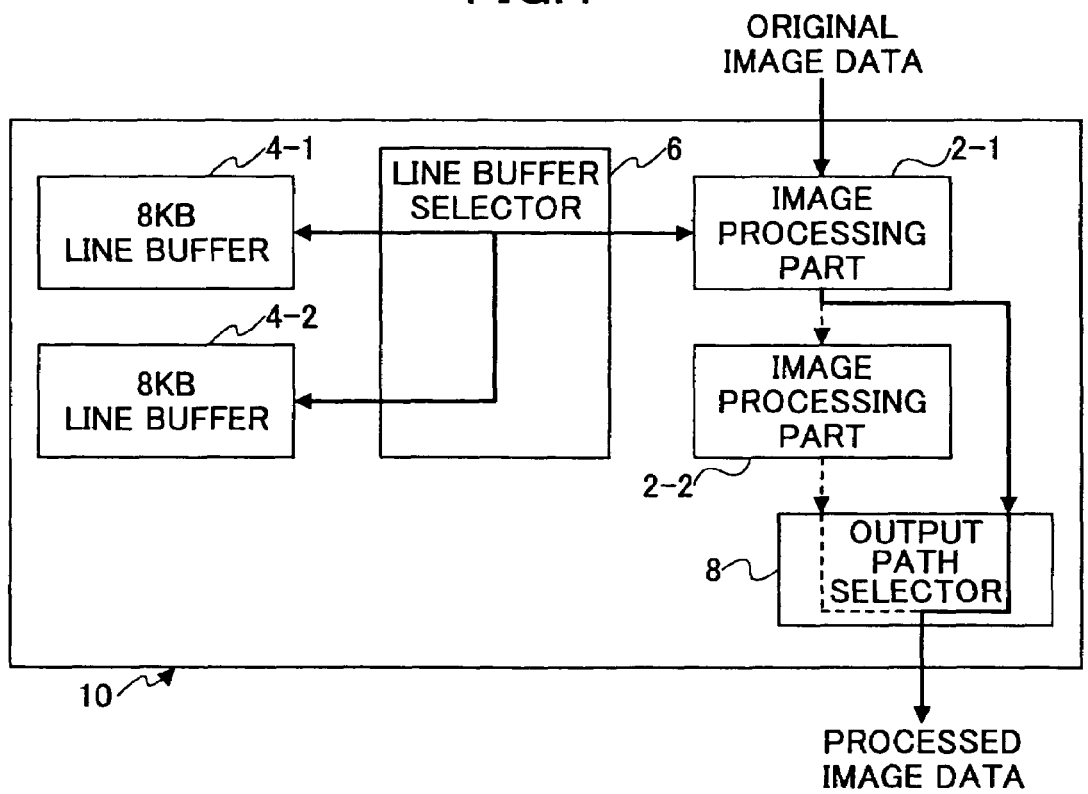

IMAGE PROCESSING CIRCUIT, COMBINED IMAGE PROCESSING CIRCUIT, AND IMAGE FORMING APPARATUS

CROSS-REFERENCE TO RELATED APPLICATION

This application is a Rule 1.53(b) Continuation of U.S. Ser. No. 10/371,631, filed Feb. 20, 2003, now U.S. Pat. No. 7,170,522, the entire contents of which are incorporated by reference herein.

BACKGROUND OF THE INVENTION

1. Field of the Invention

The present invention generally relates to an image processing circuit, a combined image processing circuit, and an image forming apparatus, all of which use a line buffer for performing image processing.

2. Description of the Related Art

In image processing such as filtering and toning, etc., not only a single target pixel but also a plurality of surrounding pixels situated on the periphery of such a target pixel are used. FIG. 1 shows the single target pixel D11 to be processed in a 3×3 matrix processing and its surrounding pixels D00, D01, D02, D10, D12, D20, D21, and D22. In the 3×3 matrix processing, when processing the pixel D11, pixel data of the pixels D10, D12 in front of and at the back of pixel D11, the pixel D01 at one line above the pixel D11 and pixels D00 and D02 in front of and at the back of pixel D01, and the pixel D21 at one line below the pixel D11 and pixels D20 and D22 in front of and at the back of pixel D21 are made reference to and used.

The pixel data of the pixels in the line preceding and following the line where the single target pixel is situated, including pixels D0$n$, D1$n$, and D2$n$ (n: 0, 1, 2), are held (stored) in a memory circuit called a line buffer and are used for later image processing. The total storage capacity of line buffers is determined according to the intended image processing. For example, in order to process pixels in the short side direction (i.e. in a single image line) of an A3 size paper (approximately 7,500 pixels per image line) with image precision of 600 dpi, which enables 600 pixels to be included in one inch, the line buffer/line buffers with a total storage capacity of approximately 8 KB are necessary. As another example, in order to perform image processing with respect to the A3 size paper with image precision of 1,200 dpi, the line buffer/line buffers with a total storage capacity of 16 KB, which is approximately the double of the processing of the A3 size paper with image precision of 600 dpi, are necessary.

The necessary number of line buffers increases as the number of image processing tasks increases. For example, when five different image processing tasks (for example, gain adjustment, filtering of a 5×5 matrix, noise elimination of a 3×3 matrix, size change, and error diffusion) are to be performed, ten 8-KB line buffers are necessary. Therefore, in order to realize these five different image processing tasks by a single chip large-scale integrated circuit (LSI), it is necessary to mount ten 8-KB line buffers onto the single LSI. In order to perform the above mentioned five different image processing tasks with respect to an A0 size paper with image precision of 600 dpi, a total of ten 24-KB line buffers is necessary since the short side direction is handled as image lines and the amount of data of a single image line is approximately three times of that of the A3 size paper. In other words, 30×8-KB line buffers are necessary in order to perform the above mentioned five different image processing tasks with respect to a single image line in the short side direction of the A0 size paper with image precision of 600 dpi.

SUMMARY OF THE INVENTION

Accordingly, in order to develop single-chip LSIs that can cope with various image processing tasks, it is necessary to mount a line buffer/line buffers with the maximum storage capacity needed for one of the image processing tasks to be performed with high precision. In such a case, the maximum storage capacity of the line buffer/line buffers is not fully used when image processing of lower precision tasks is performed. Therefore, when mounting the line buffer/line buffers so as to correspond to the maximum storage capacity needed for one of the image processing tasks to be performed with high precision, not only the production cost increases but also the storage capacity of the line buffer/line buffers is not effectively used. For example, when processing an A3 size paper with precision of 600 dpi, not all the storage capacity necessary for processing an A3 size paper with precision of 1,200 dpi is used. Therefore, when the storage capacity of the line buffer/line buffers is set to the maximum storage capacity necessary for performing an image processing task with high precision, the storage capacity of the line buffer/line buffers cannot be effectively used when image processing with low precision is performed and there is a surplus storage capacity.

In order to address such a problem, it is conceivable to optimize the production cost by changing the total storage capacity or the number of the line buffers to be mounted on the single LSI depending on the image processing. For example, for machines with higher grades that realize image processing tasks with high precision, LSIs mounted with a large number of line buffers with a large storage capacity may be developed and for machines with lower grades that do not perform image processing tasks with high precision, LSIs mounted with a small number of line buffers with a small storage capacity may be developed. However, developing appropriate LSIs for respective machines in turn increases the development cost.

Japanese Laid-Open Patent Application No. 04-300812 (publication no. 06-149994) discloses a method of reducing the number of line buffers by sharing a single memory as a plurality of line buffers. However, the invention disclosed in this application cannot be adapted to the case when a plurality of image processing tasks is to be performed simultaneously. Japanese Laid-Open Patent Application No. 05-158897 (publication no. 07-44696) also discloses a method of reducing the number of line buffers, however this invention is also unable to cope with the case when the number of pixels to be processed exceeds the storage capacity of the single line buffer. Japanese Laid-Open Patent Application No. 09-151185 (publication no. 10-340340) discloses a technique for changing the number of effective bits for each image processing task, i.e. the precision for each image processing task, by changing the allocation of the line buffers in a bit direction in a memory. However, this invention is also unable to cope with the case when the number of pixels increases.

Therefore, an object of the present invention is to provide an image processing circuit, a combined image processing circuit, and an image forming apparatus, all of which can be adapted to the increase or the decrease in the number of pixels to be processed and the number of image processing tasks, so that the increase in the overall cost including the production cost and the development cost can be kept to the minimum.

According to a first aspect of the present invention, there is provided an image processing circuit. The image processing circuit comprises a plurality of line buffers, each line buffer storing pixel data of a plurality of pixels as line data, the plurality of pixels configuring a single image line of an image; a first image processing part performing a first image processing task on original image data provided from the exterior by using the line data stored in at least one of the plurality of line buffers and that provides processed image data; a second image processing part performing a second image processing task on the processed image data provided from the first image processing part by using the line data stored in at least one of the plurality of line buffers, and providing processed image data; a line buffer selector that selectively connects the first image processing part and the second image processing part to any number of line buffers among the plurality of line buffers; and an output path selector that selects one of an output path that skips the second image processing task and an output path that performs the second image processing task.

In the image processing circuit according to the first aspect of the present invention, the number of line buffers connected to said first image processing part indicates the number of image lines necessary for the first image processing task, and the number of line buffers connected to the second image processing part indicates the number of image lines necessary for the second image processing task.

According to a second aspect of the present invention, there is provided another image processing circuit. The image processing circuit comprises a plurality of line buffers, each line buffer storing pixel data of a plurality of pixels as line data, that plurality of pixels configuring a single image line of an image; a first image processing part performing a first image processing task on original image data provided from the exterior by using the line data stored in at least one of the plurality of line buffers, and providing processed image data; a second image processing part performing a second image processing task on the processed image data provided from the first image processing part by using the line data stored in at least one of the plurality of line buffers, and providing processed image data; a line buffer selector that selectively connects the first image processing part and the second image processing part to any number of line buffers among the plurality of line buffers; a first output path selector that selects one of an output path that skips the first image processing task and an output path that performs the first image processing task; and a second output path selector that selects one of an output path that skips the second image processing task and an output path that performs the second image processing task.

According to a third aspect of the present invention, there is provided a combined image processing circuit. The combined image processing circuit comprises a first image processing circuit and a second image processing circuit serially connected to one another. Each image processing circuit comprises a plurality of line buffers, each line buffer storing pixel data of a plurality of pixels as line data, the plurality of pixels configuring a single image line of an image; a first image processing part performing a first image processing task on original image data provided thereto by using the line data stored in at least one of the plurality of line buffers, and providing processed image data; a second image processing part performing a second image processing task on image data provided thereto by using the line data stored in at least one of the plurality of line buffers, and providing processed image data; a line buffer selector that selectively connects the first image processing part and the second image processing part to any number of line buffers among the plurality of line buffers; a first output path selector that selects one of an output path that skips the first image processing task and an output path that performs the first image processing task; and a second output path selector that selects one of an output path that skips the second image processing task and an output path that performs the second image processing task.

Therefore, according to the first to the third aspects of the present invention, by providing the line buffer selector, the first image processing part and the second image processing part can access more than two line buffers. By doing so, the first image processing part and the second image processing part can perform image processing with higher precision, i.e. image processing that necessitates a larger amount of pixel data of the plurality of pixels configuring the image, as compared to image processing that only uses a single line buffer. The first image processing part and the second image processing part can also access a single line buffer that stores the line data, therefore, the pixel data with various sizes can be processed by a single image processing circuit.

Further, since the output path selector that selects one of the output path that skips an image processing task and the output path that performs the image processing task is provided, it is possible to arbitrarily select certain image processing tasks to be applicable.

Further, since the second image processing part performs the second image processing task using line data from line buffers different from those used for performing the first image processing task, it is possible to perform all necessary image processing tasks at the same time.

Further, since two image processing circuits having the configuration as mentioned above are serially connected to one another, it is possible to perform all necessary image processing tasks at the same time without making modification to the single image processing circuit.

Further, since the image processing parts can access the plurality of line buffers, it is possible to perform image processing that does not depend on the size of the pixel data of the image. Since the line buffers with the minimum required storage capacity are mounted on the LSI in view of performing image processing on the standard image, there is no increase in production cost. In addition, when image processing is to be performed on an image having a larger size than that of the standard image, i.e. when a larger amount of pixel data is to be processed, a plurality of image processing circuits can be combined so as to form the combined image processing circuit, and by selecting appropriate operations of the selectors in the combined image processing circuit, it is possible to perform all necessary image processing tasks at the same time with respect to the image having a larger size than that of the standard image. Therefore, no additional design development cost is needed.

According to a fourth aspect of the present invention, there is provided an image forming apparatus, which comprises a scanning part that scans an image and obtains pixel data of a plurality of pixels configuring the image; a combined image processing circuit, which is configured as described above, provides processed image data by performing image processing on the pixel data obtained by the scanning part; a data generating part that generates a laser driving signal corresponding to the image based on the processed image data provided from the combined image processing circuit; and a printing part that is provided with a laser and a photoconductor, drives the laser based on the laser driving signal generated by the data generating part, exposes the electrically charged photoconductor so as to form a electrostatic latent image corresponding to the image, and prints the image developed by toner onto a transfer sheet.

According to the fourth aspect of the present invention, the image forming apparatus may be a copier.

According to a fifth aspect of the present invention, there is provided an image forming apparatus, which comprises a scanning part that scans an image and obtains pixel data of a plurality of pixels configuring the image; a combined image processing circuit, which is configured as described above, that provides processed image data by performing image processing on the pixel data obtained by the scanning part; a data generating part that generates transmission data by performing compression coding on the processed image data provided from the combined image processing circuit; and a transmission part that transmits the transmission data generated by the data generating part to a signal line.

According to the fifth aspect of the present invention, the image forming apparatus may be a facsimile machine.

Since the combined image processing circuit according to the present invention is used, it is possible to realize, when necessary, a copier and a facsimile machine that can perform image processing with higher precision, i.e. that can process a larger amount of pixel data, by increasing the number of image processing circuits to be included in respective apparatuses. Therefore, there is no need to develop new circuit designs depending on the grades of the apparatuses and thus the increase in the overall cost including the production cost and the development cost can be kept to the minimum.

BRIEF DESCRIPTION OF THE DRAWINGS

FIG. 3 shows a block diagram illustrating one configuration of an image processing circuit according to the first embodiment of the present invention, which circuit includes a line buffer selector set to perform a one-by-one selection operation and an output path selector set to perform a serial processing selection operation;

FIG. 4 shows a block diagram illustrating another configuration of an image processing circuit according to the first embodiment of the present invention, which circuit includes a line buffer selector set to perform a two-on-one selection operation and an output path selector set to perform a bypass processing selection operation;

DETAILED DESCRIPTION OF THE PREFERRED EMBODIMENTS

Figures 1, 2:
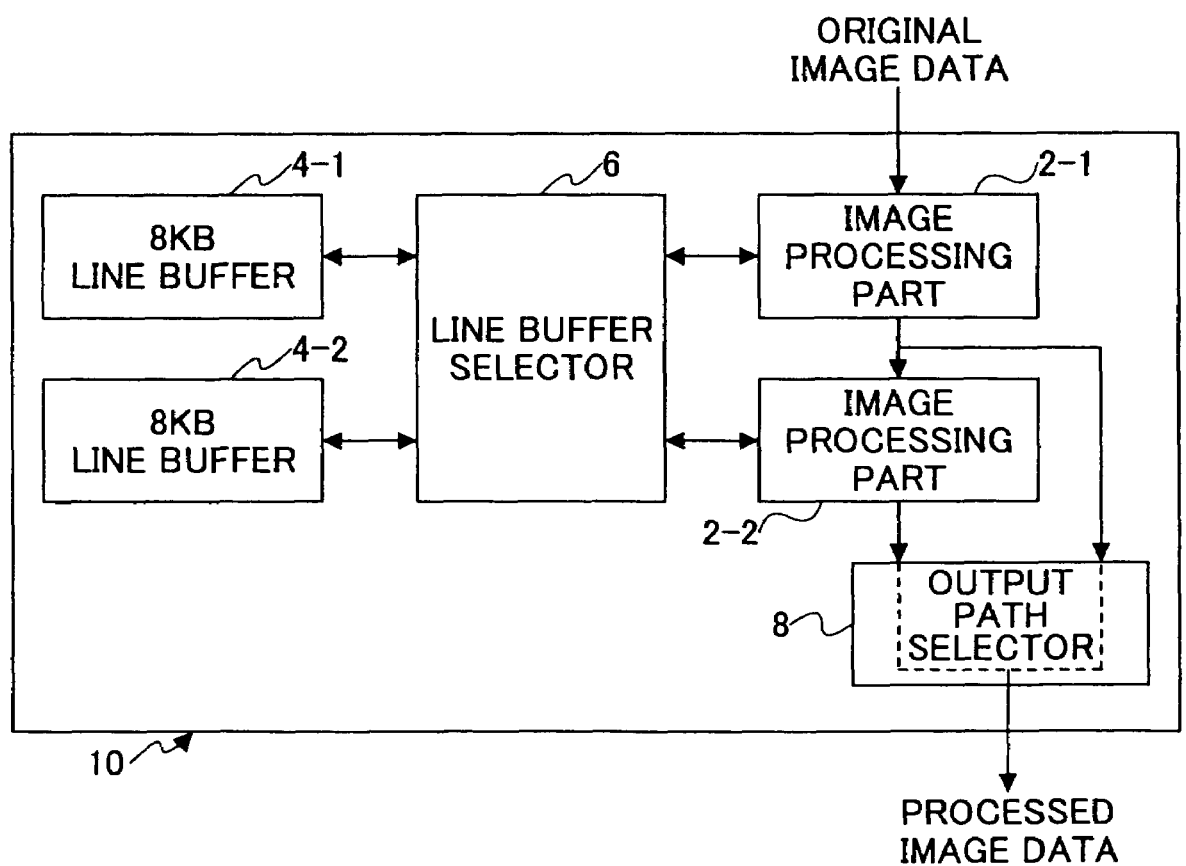
FIG. 1 shows a single pixel that is the object to be processed in a 3×3 matrix processing and its surrounding pixels.
FIG. 2 shows a block diagram illustrating a basic configuration of an image processing circuit according to a first embodiment of the present invention.

In the following, a plurality of embodiments of the present invention is described with reference to the accompanying figures. A first embodiment of the present invention describes the basic principles of the present invention. A second, a third, and a fourth embodiment of the present invention describe modified examples of the first embodiment. A fifth and a sixth embodiment of the present invention describe application examples of the present invention. In the figures, elements having same functions are denoted by the same reference numerals.

FIG. 2 shows a block diagram illustrating a basic configuration of an image processing circuit 10 according to the first embodiment of the present invention. The image processing circuit 10 is formed on a single large-scale semiconductor integrated circuit (LSI) or a single IC chip. The image processing circuit 10 receives original image data, which is an object to be processed, performs predetermined image processing on the received original image data, and outputs processed image data. The original image data are such as pixel data of a plurality of pixels configuring an image read out by a scanner (not shown) or pixel data of a plurality of pixels provided from a computer (not shown). The processed image data are pixel data of pixels that are processed by image processing parts, which are to be explained below.

The image processing circuit 10 is provided with a first image processing part 2-1, a second image processing part 2-2, a first line buffer 4-1, a second line buffer 4-2, a line buffer selector 6, and an output path selector 8. The first image processing part 2-1 and the second image processing part 2-2 perform the same or different image processing tasks simultaneously and provide the processed image data, respectively. For example, the first image processing part 2-1 performs gain adjustment and the second image processing part 2-2 performs error diffusion. The first line buffer 4-1 and the second line buffer 4-2 are each provided with a storage capacity of 8 KB. For example, each line buffer can store pixel data of pixels of a single line (approximately 7,500 pixels) in the short side direction of an A3 size paper with precision of 600 dpi that enables 600 pixels to be included in one inch. In other words, the first line buffer 4-1 and the second line buffer 4-2 each stores image data with respect to an image line. The image data corresponding to a single image line is also called line data. The line buffer selector 6 is provided between the image processing parts 2-1, 2-2 and the line buffers 4-1, 4-2 and selectively connects the image processing parts and the line buffers to one another. The output path selector 8 is connected to the outputs of both the first image processing part 2-1 and the second image processing part 2-2. By selecting the output path either from the first image processing part 2-1 and the second image processing part 2-2, the output path selector 8 selectively provides one of the processed results from the image processing parts 2-1, 2-2 as processed image data.

The following is a description of selection operations of the line buffer selector 6 and the output path selector 8. The line buffer selector 6 and the output path selector 8 perform the selection operations based on a selection signal from a control part (not shown) such as a central processing unit (CPU) provided outside of the image processing circuit 10, a value of a register (not shown), or a selection switch provided outside of the image processing circuit 10.

The line buffer selector 6 performs two selection operations. One is a one-on-one selection operation where the first line buffer 4-1 is connected to the first image processing part 2-1 and the second line buffer 4-2 is connected to the second image processing part 2-2, respectively. The other is a two-on-one selection operation where the first line buffer 4-1 and the second line buffer 4-2 are combined as a single line buffer having a storage capacity of 16 KB and connected to either the first image processing part 2-1 or the second image processing 2-2.

The output path selector 8 also performs two selection operations. One is a bypass processing selection operation where only the processed result of the image processing part 2-1 is provided. When the output path selector 8 is set to perform the bypass processing selection operation, the processed result of the first image processing part 2-1 is bypassed (skipped) without being processed in the second image processing part 2-2 and is provided as processed image data. When the first image processing part 2-1 performs gain adjustment as mentioned above, only the gain adjustment is performed on the original image data and the gain adjusted original image data are provided as the processed image data.

The other is a serial processing selection operation where the processed result of the second image processing part 2-2 is provided. When the output path selector 8 is set to perform the serial processing selection operation, the processed result from the first image processing part 2-1 is further processed in the second image processing part 2-2 and the processed result from the second image processing part 2-2 is provided as the processed image data. When the second processing part 2-2 performs error diffusion as mentioned above, the error diffusion is performed on the gain adjusted original image data and the gain adjusted and error diffused original image data are provided as the processed image data.

The reason for providing both the line buffer selector and the output path selector is to enable the image processing circuit 10 to be used for a plurality of product types having different functions. For example, when comparing the case where the output path selector 8 is set to perform the bypass processing selection operation and the case where the output path selector 8 is set to perform the serial processing selection operation, the latter can perform a more complicated image processing task than the former. Further, when comparing the case where the line buffer selector 6 is set to perform the one-on-one selection operation and the case where the line buffer selector 6 is set to perform the two-on-one selection operation, in the latter case, the single image processing part is provided with a storage capacity twice the size of the storage capacity provided to the single image processing part in the former case. Therefore, when the line buffer selector is set to perform the two-on-one selection operation, the single image processing part can perform image processing on pixels twice the number of the pixels processed in the case when the line buffer selector is set to perform the one-on-one selection operation. Accordingly, it can be said that in both comparison examples of the output path selector and the line buffer selector, the former setting (i.e. the output path selector is set to the bypass processing selection operation and the line buffer selector is set to the one-on-one selection operation) is suited for machines with simple functions (tasks) and the latter setting (i.e. the output path selector is set to the serial processing selection operation and the line buffer selector is set to the two-on-one selection operation) is suited for machines with complicated functions (tasks.)

It is true that when the output path selector 8 is set to perform the bypass processing selection operation, component cost (production cost) of the second image processing part 2-2 is wasteful since it is not used. However, with the image processing circuit according to the present invention, it is possible to adapt to a plurality of product types having different functions. As a result, the development cost can be reduced since it is not necessary to design image processing circuits with respect to each function. Therefore, it is possible to keep the increase in the overall cost including the production cost and the development cost to the minimum.

FIG. 3 shows a block diagram illustrating one configuration of the image processing circuit 10 according to the first embodiment of the present invention, which configuration includes the line buffer selector 6 set to perform the one-on-one selection operation and the output path selector 8 set to perform the serial processing selection operation. The first image processing part 2-1 reads out line data stored in the first line buffer 4-1 via the line buffer selector 6. The second image processing part 2-2 reads out line data stored in the second line buffer 4-2 via the line buffer selector 6. In this example, the first image processing part 2-1 never accesses the second line buffer 4-2 and the second image processing part 2-2 never accesses the first line buffer 4-1. Since the first image processing part 2-1 and the second image processing part 2-2 can access the first line buffer 4-1 and the second line buffer 4-2, respectively, together they can, for example, process pixel data of pixels of a single image line in a short side direction of an A3 size paper with precision of 600 dpi. The image processing circuit 10 provides the original image data processed by the first image processing part 2-1 and the second image processing part 2-2 as the processed image data via the output path selector 8.

FIG. 4 shows a block diagram illustrating another configuration of the image processing circuit 10 according to the first embodiment of the present invention, which configuration includes the line buffer selector 6 set to perform the two-on-one selection operation and the output path selector 8 set to perform the bypass processing selection operation. Since the line buffer selector 6 is set to perform the two-on-one selection operation, the first image processing part 2-1 can use both the first line buffer 4-1 and the second line buffer 4-2 as a single line buffer with a storage capacity of 16 KB. Compared to the one-on-one selection operation where only one line buffer with the storage capacity of 8 KB is used, the first image processing part 2-1 can perform image processing that needs pixel data twice the amount of pixel data processed with the one-on-one selection operation. For example, the first image processing part 2-1 can perform the image processing with precision of 1,200 dpi. The original image data processed in the first image processing part 2-1 is bypassed (skipped) without being processed in the second image processing part 2-2 and is provided as the processed image data.

The line buffer is generally configured from a memory of a first-in first-out (FIFO) type, however, the configuration of the circuit realizing FIFO and the types of memories are not particularly limited. For example, a random access memory (RAM) or a register may be used. In addition, the bit width and the word length of a line buffer are also not particularly limited.

The following is a description of an image processing circuit 40 according to the second embodiment of the present invention.

Figure 5:
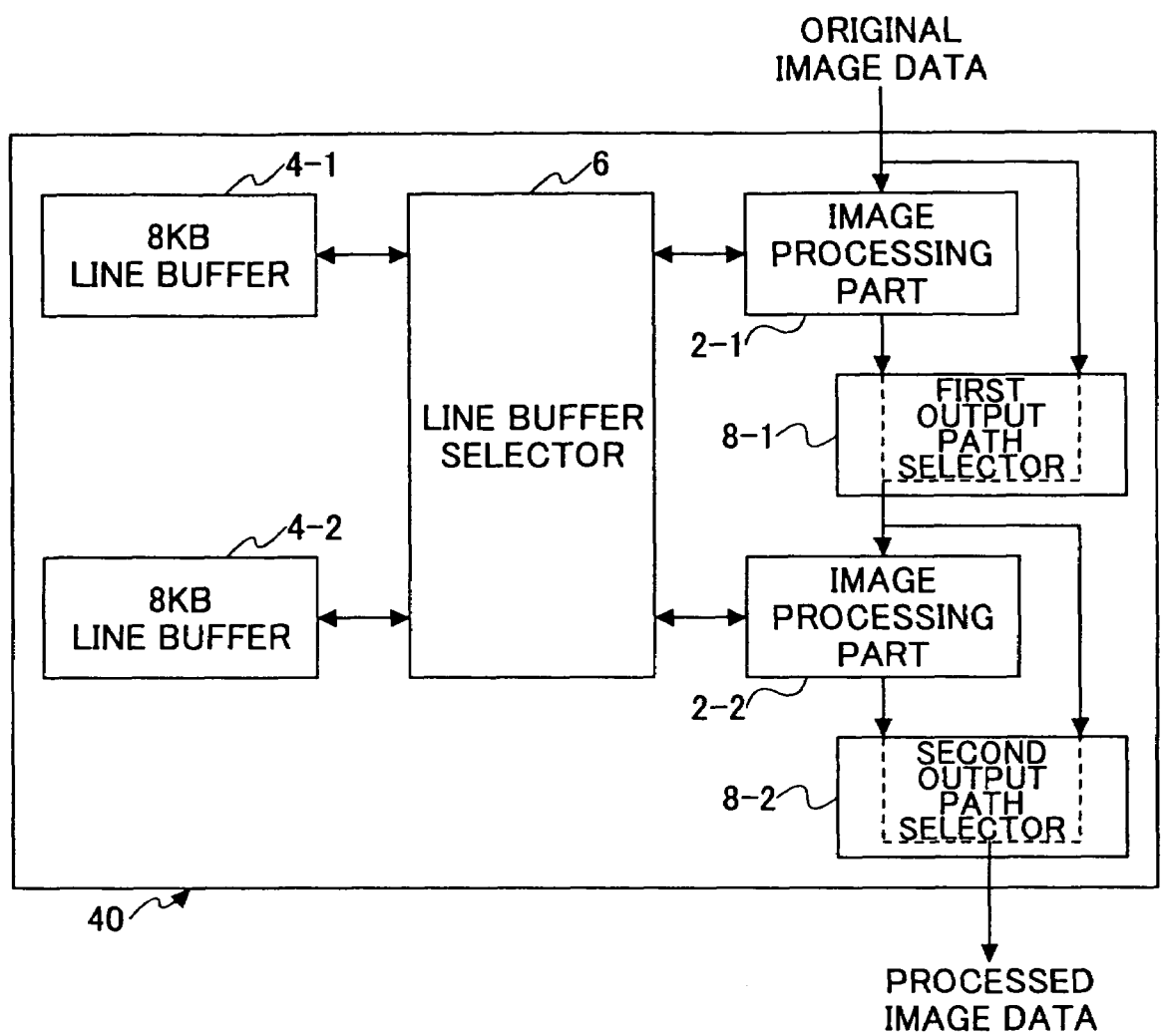
FIG. 5 shows a block diagram illustrating a basic configuration of an image processing circuit according to a second embodiment of the present invention.

FIG. 5 shows a block diagram illustrating a basic configuration of the image processing circuit 40 according to the second embodiment of the present invention. The image processing circuit 40 according to the second embodiment of the present invention is a modification of the image processing circuit 10 according to the first embodiment of the present invention. The basic functions of the image processing circuit 40 according to the second embodiment are the same as that of image processing circuit 10 according to the first embodiment of the present invention (FIG. 2.)

The image processing circuit 40 according to the second embodiment of the present invention differs from the image processing circuit 10 according to the first embodiment of the present invention in that an additional output path selector 8-1 is provided between the first image processing part 2-1 and the second image processing part 2-2. The output path selector 8-2 shown in FIG. 5 functions as the output path selector 8 shown in the image processing circuit 10 according to the first embodiment of the present invention (FIG. 2). As a matter of convenience, the additional output path selector 8-1 is referred to as a first output path selector 8-1 and the output path selector 8-2 is referred to as a second output path selector 8-2 in the following description.

The first output path selector 8-1 is connected to both the signal path from the exterior and the output of the first image processing part 2-1, and it also performs two selection operations. One is a bypass processing selection operation where the image processing in the first image processing part is skipped and the original image data from the exterior are directly provided to the second image processing part 2-2. The other is a serial processing selection operation where the original image data are processed in the first image processing part 2-1 and the processed image data are provided as the processed result to the second image processing part 2-2. Therefore, when the first output path selector 8-1 is set to perform the bypass processing selection operation, the second image processing part 2-2 can directly process the original image data. The line buffer selector 6 can be set to perform the two-on-one selection operation with respect to the second image processing part 2-2 so as to enable the second image processing part 2-2 to access both the first line buffer 4-1 and the second line buffer 4-2. In particular, when the first image processing part 2-1 is to perform gain adjustment and the second image processing part 2-2 is to perform error diffusion as mentioned in the first embodiment of the present invention, the error diffusion can be directly performed on the original image data without being gain adjusted in the first image processing part 2-1.

Figure 6:
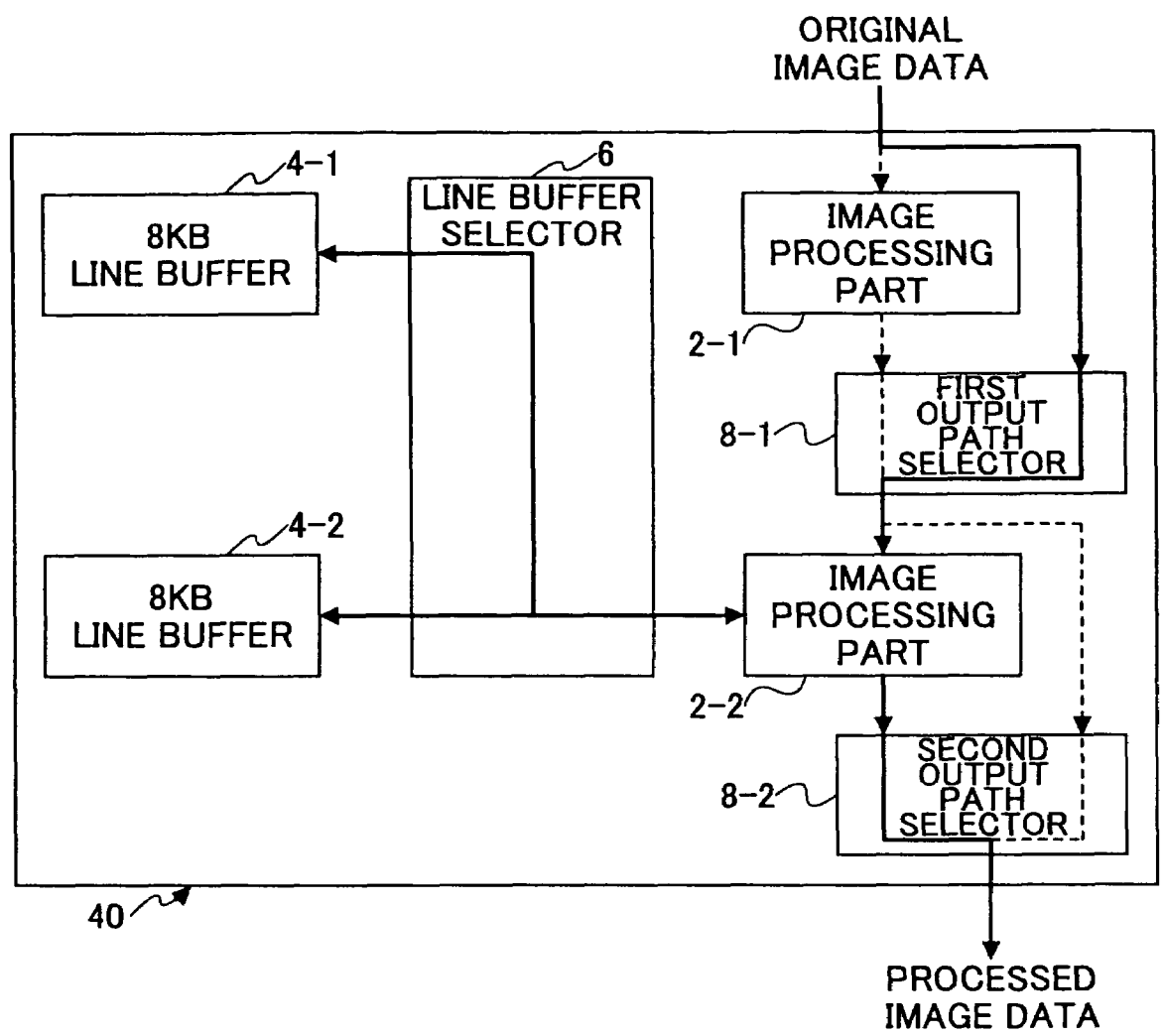
FIG. 6 shows a block diagram illustrating one configuration of an image processing circuit according to the second embodiment of the present invention, which configuration includes a line buffer selector set to perform a two-on-one selection operation, a first output path selector set to perform a bypass processing selection operation, and a second output path selector set to perform a serial processing selection operation.

FIG. 6 shows a block diagram illustrating one configuration of the image processing circuit 40 according to the second embodiment of the present invention, which configuration includes the line buffer selector 6 set to perform the two-on-one selection operation, the first output path selector 8-1 set to perform the bypass processing selection operation, and the second output path selector 8-2 set to perform the serial processing selection operation. As is apparent from FIG. 6, when the first output path selector 8-1 is set to perform the bypass processing selection operation, the second image processing part 2-2 receives the original image data directly and can realize image processing with high precision by using the first line buffer 4-1 and the second line buffer 4-2 as a single line buffer having a storage capacity of 16 KB.

It is possible to realize an image processing circuit that performs even more complicated image processing by combining a plurality of image processing circuits according to the present invention described below.

Figure 7:
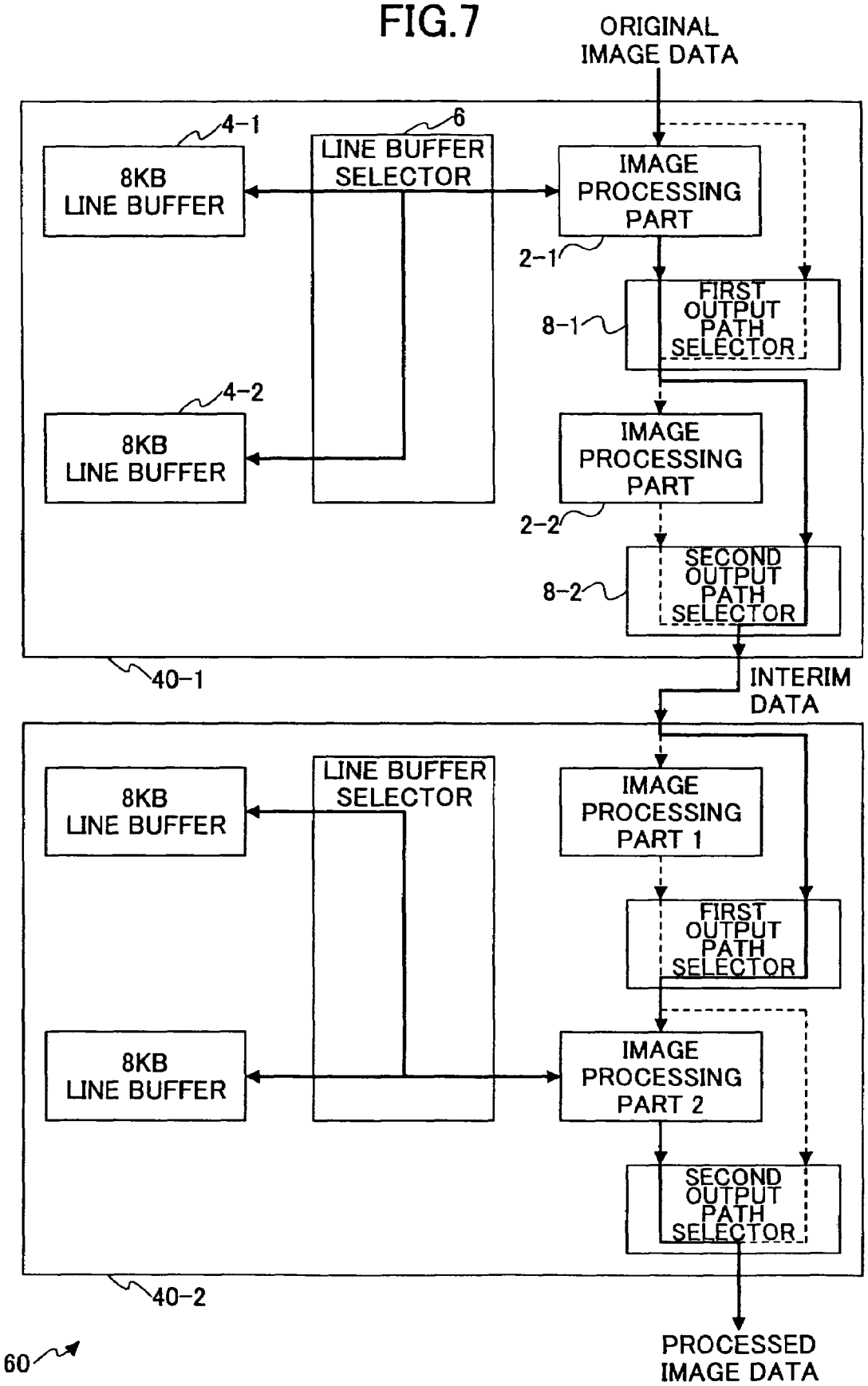
FIG. 7 shows a block diagram illustrating a configuration of a combined image processing circuit according to a third embodiment of the present invention, which configuration is formed by serially connecting two image processing circuits.

FIG. 7 shows a block diagram illustrating a configuration of a combined image processing circuit 60 according to the third embodiment of the present invention, which combined image processing circuit 60 has two image processing circuits, a first image processing circuit 40-1 and a second image processing circuit 40-2, serially connected to one another. Each of the image processing circuits 40-1, 40-2 is configured from the image processing circuit 40 according to the second embodiment of the present invention (FIG. 5). Data provided from the first image processing circuit 40-1 to be provided to the second image processing circuit 40-2 are shown as interim data in FIG. 7.

In the first image processing circuit 40-1, since the line buffer 6 is set to perform the two-on-one selection operation, the first image processing part 2-1 can access both the first line buffer 4-1 and the second line buffer 4-2 and can perform image processing on line data up to 16 KB. This in turn means that the first output path selector 8-1 is set to perform the serial processing selection operation. The image processing in the second image processing part 2-2 is bypassed (skipped) since the second output path selector 8-2 is set to perform the bypass processing selection operation. As for the second image processing circuit 40-2, the functions are the same as those of the image processing circuit 40 according to the second embodiment of the present invention shown in FIG. 6, therefore the description of which is omitted.

By serially connecting two image processing circuits, it is possible to perform image processing more complicated than that is possible with only one image processing circuit. In addition, each image processing part in the combined image processing circuit according to the third embodiment of the present invention can perform image processing on line data up to 16 KB when the line buffer selectors 6 are set to the two-on-one selection operations, respectively. Since it is not necessary to design different image processing circuits with respect to different line buffer storage capacities when the image processing circuit/the combined image processing circuit according to the present invention is used, it is possible to increase the number of pixels to be processed without incurring additional cost for design development.

Figure 8:
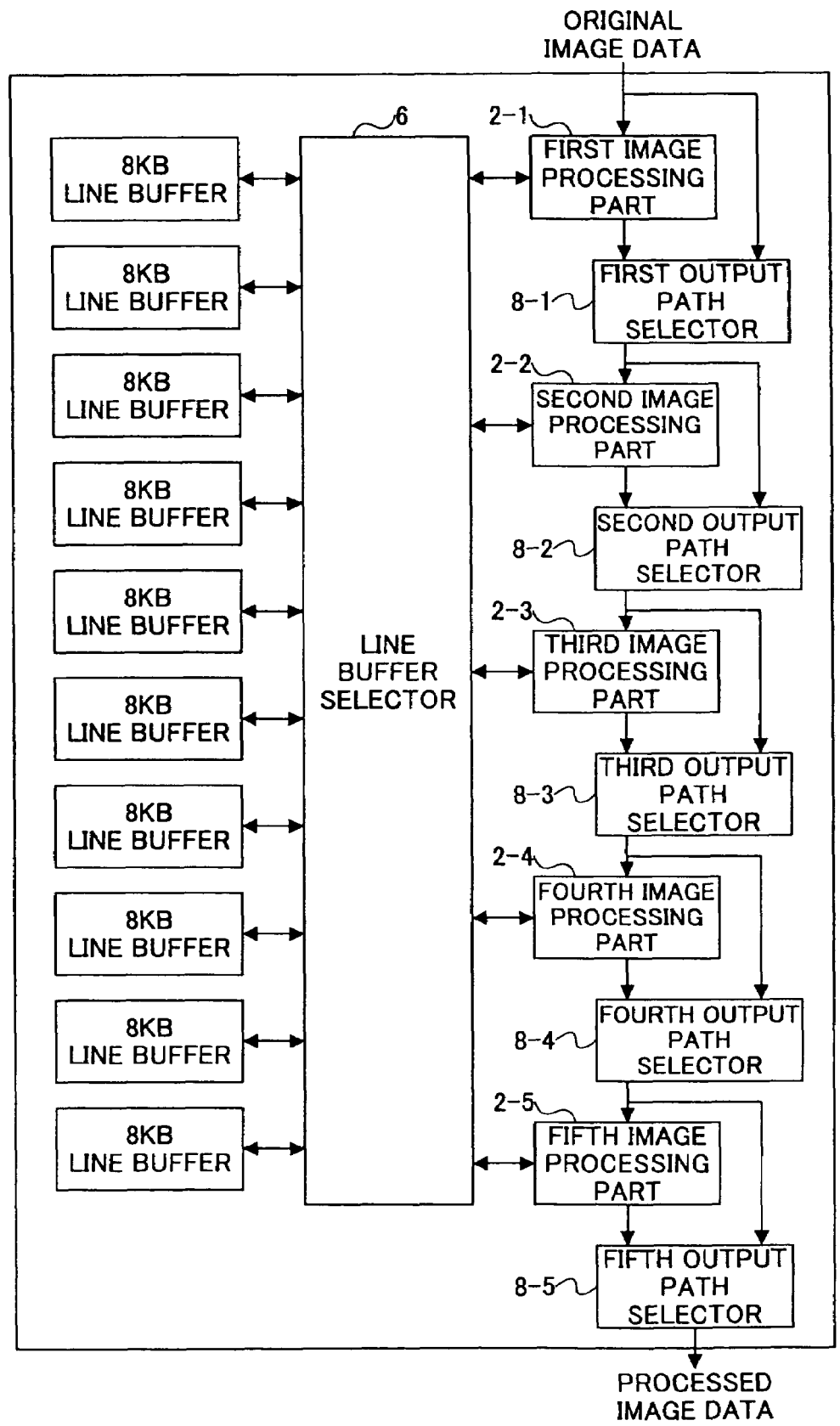
FIG. 8 shows a block diagram illustrating a configuration of an image processing circuit according to a fourth embodiment of the present invention.

FIG. 8 shows a block diagram illustrating a configuration of an image processing circuit 70 according to the fourth embodiment of the present invention. The image processing circuit 70 according to the fourth embodiment is formed on a single large scaled semiconductor integrated circuit (LSI) or a single IC chip.

The image processing circuit 70 according to the fourth embodiment of the present invention is provided with five image processing parts (2-1, 2-2, 2-3, 2-4, and 2-5), ten line buffers (4-1, 4-2, 4-3, 4-4, 4-5, 4-6, 4-7, 4-8, 4-9, and 4-10), a line buffer selector 6, and five output path selectors (8-1, 8-2, 8-3, 8-4, and 8-5). The image processing circuit 70 according to the fourth embodiment of the present invention is configured basically the same as the image processing circuit 40 according to the second embodiment of the present invention (FIG. 5), however the numbers of image processing parts, the line buffers, and the output path selectors are increased to five, ten, and six, respectively.

The image processing parts (2-1, 2-2, 2-3, 2-4, 2-5) perform five different image processing tasks, respectively. Particularly, the first image processing part 2-1 performs gain adjustment, the second image processing part 2-2 performs filtering of a 3×3 matrix, the third image processing part 2-3 performs size change, the fourth image processing part 2-4 performs noise elimination of a 4×4 matrix, and the fifth image processing part 2-5 performs error diffusion of a 3×3 matrix. Each image processing part can individually access any number of line buffers and acquire pixel data necessary for the respective image processing task. The necessary number of line buffers depends on the image processing task. Therefore, for example, when the fourth image processing part 2-4 needs pixel data corresponding to three image lines, three line buffers that store are allocated to the fourth image processing part 2-4 and an image of a standard size (for example, an image in which a single image line corresponds to 8 KB data) can be processed. When pixel data of a single image line (image line capacity) correspond to the total storage capacity of two line buffers, two line buffers may be allocated to each image line. This makes it possible to process an image with a quality twice higher than the standard image or with a size twice larger than the standard image (for example, an image in which a single image line corresponds to 16 KB data).

As an example, a case when processing a standard image in the image processing circuit 70 according to the fourth embodiment of the present invention is described below. Each image line of the standard image corresponds to 8 KB data, which means that the image line capacity is the same as the storage capacity of a single 8-KB line buffer. Table 1 shows the relation (allocation pattern) between the number of image lines necessary for the respective image processing parts (2-1, 2-2, 2-3, 2-4, and 2-5) to perform image processing tasks and the number of line buffers to be allocated to the respective image processing parts.

TABLE 1

STANDARD IMAGE

| | NUMBER OF IMAGE LINES NECESSARY FOR PROCESSING | NUMBER OF LINE BUFFERS TO BE ALLOCATED | IMAGE PROCESSING APPLICABILITY |
|---|---|---|---|
| FIRST IMAGE PROCESSING PART 2-1 | 1 | 1 × 1 = 1 | APPLICABLE |
| SECOND IMAGE PROCESSING PART 2-2 | 2 | 1 × 2 = 2 | APPLICABLE |
| THIRD IMAGE PROCESSING PART 2-3 | 2 | 1 × 2 = 2 | APPLICABLE |
| FOURTH IMAGE PROCESSING PART 2-4 | 3 | 1 × 3 = 3 | APPLICABLE |
| FIFTH IMAGE PROCESSING PART 2-5 | 2 | 1 × 2 = 2 | APPLICABLE |

According to Table 1, the first image processing part 2-1 needs image data of 8 KB corresponding to a single image line. Therefore, a single 8-KB line buffer is allocated to the first image processing part 2-1. The second, the third, and the fifth imaging part 2-2, 2-3, and 2-5 need image data of 16 KB corresponding to two image lines each. Therefore, two 8-KB line buffers are allocated to each of the image processing parts. The fourth image processing part 2-4 needs image data of 24 KB corresponding to three image lines. Therefore, three 8-KB line buffers are allocated to the fourth image processing part 2-4. Accordingly, in total, ten line buffers are necessary in order to perform image processing tasks in the respective image processing parts. Since there are ten 8-KB line buffers mounted on the single LSI as shown in FIG. 8, it is possible to realize all image processing tasks using the single LSI. Thus, the image processing task in each image processing part is "applicable", which means that each image processing task in the respective image processing parts can be realized with respect to the image having the image line capacity up to 8 KB. The output path selectors (8-1, 8-2, 8-3, 8-4, and 8-5) are all set to receive the processed result from the associated image processing part. The line buffer selector 6 operates so as to connect the respective necessary number of line buffers to each image processing part, which number is indicated in Table 1 as "number of line buffers to be allocated."

As another example, a case when processing an image twice the size of the standard image, which is described with respect to Table 1, in the image processing circuit 70 according to the fourth embodiment of the present invention is described below with respect to Table 2 and Table 3. Each image line of the image twice the size of the standard image has the image line capacity of 16 KB data, which means that the capacity of the single image line corresponds to the total storage capacity of two line buffers.

TABLE 2

IMAGE WITH TWICE THE SIZE OF STANDARD IMAGE: PATTERN A

| | NUMBER OF IMAGE LINES NECESSARY FOR PROCESSING | NUMBER OF LINE BUFFERS TO BE ALLOCATED | IMAGE PROCESSING APPLICABILITY |
|---|---|---|---|
| FIRST IMAGE PROCESSING PART 2-1 | 1 | 2 × 1 = 2 | APPLICABLE |
| SECOND IMAGE PROCESSING PART 2-2 | 2 | 2 × 2 = 4 | APPLICABLE |
| THIRD IMAGE PROCESSING PART 2-3 | 2 | 2 × 2 = 4 | APPLICABLE |
| FOURTH IMAGE PROCESSING PART 2-4 | 3 | 0 × 3 = 0 | NA (SKIP) |
| FIFTH IMAGE PROCESSING PART 2-5 | 2 | 0 × 2 = 0 | NA (SKIP) |

NA: NOT APPLICABLE

As is apparent from the allocation pattern A shown in Table 2, the first image processing part 2-1 needs image data of 16 KB corresponding to a single image line, the second image processing part 2-2 and the third image processing part 2-3 each need image data of 32 KB corresponding to two image lines. In order to provide the first image processing part 2-1, the second image processing part 2-2, and the third image processing part 2-3 with image data according to the necessary number of image lines, all ten line buffers in the image processing circuit 70 according to the fourth embodiment of the present invention are allocated. Therefore, the image processing circuit 70 according to the fourth embodiment of the present invention can realize image processing tasks (i.e. gain adjustment, filtering of the 3×3 matrix, and size change) in the first through the third image processing parts 2-1, 2-2, and 2-3 with respect to the image having the image line capacity up to 16 KB.

However, this in turn means the image processing tasks (noise elimination of the 4×4 matrix and error diffusion of the 3×3 matrix) of the fourth image processing part 2-4 and the fifth image processing part 2-5 are not performed by the single LSI, onto which the image processing circuit 70 according to the fourth embodiment of the present invention is mounted. Therefore, in order to realize the image processing tasks in the fourth image processing part 2-4 and the fifth image processing part 2-5, it is necessary to provide an additional image processing circuit 70 according to the fourth embodiment of the present invention so as to perform the line buffer allocation pattern B in Table 3.

TABLE 3

IMAGE WITH TWICE THE SIZE OF STANDARD IMAGE: PATTERN B

| | NUMBER OF IMAGE LINES NECESSARY FOR PROCESSING | NUMBER OF LINE BUFFERS TO BE ALLOCATED | IMAGE PROCESSING APPLICABILITY |
|---|---|---|---|
| FIRST IMAGE PROCESSING PART 2-1 | 1 | 0 × 1 = 0 | NA (SKIP) |
| SECOND IMAGE PROCESSING PART 2-2 | 2 | 0 × 2 = 0 | NA (SKIP) |
| THIRD IMAGE PROCESSING PART 2-3 | 2 | 0 × 2 = 0 | NA (SKIP) |
| FOURTH IMAGE PROCESSING PART 2-4 | 3 | 2 × 3 = 6 | APPLICABLE |
| FIFTH IMAGE PROCESSING PART 2-5 | 2 | 2 × 2 = 4 | APPLICABLE |

NA: NOT APPLICABLE

As shown in Table 3, the image processing tasks in the first image processing part 2-1, the second image processing part 2-2, and the third image processing part 3-3, which are already finished (allocated), are disabled ("not applicable".) By allocating the line buffers on the additional image processing circuit 70 according to the fourth embodiment of the present invention only to the fourth image processing part 2-4 and the fifth processing part 2-5, it is possible to perform the image processing tasks in the fourth image processing part 2-4 and the fifth image processing part 2-5 with respect to the image having the image line capacity up to 16 KB by the single LSI, onto which the additional image processing circuit according to the fourth embodiment of the present invention is mounted.

Therefore, by combining the allocation pattern A in Table 2 and the allocation pattern B in Table 3, it is possible to realize all five different image processing tasks with respect to the image having image line capacity up to 16 KB by the single LSI, onto which two image processing circuits 70 according to the fourth embodiment of the present invention are mounted.

As another example, a case when processing an image three times the size of the standard image by a single LSI, onto which a plurality of image processing circuits according to the fourth embodiment of the present invention is provided, is described with respect to Table 4 through Table 7. Each image line of the image three times the size of the standard image has the image line capacity of 24 KB data, which means that the capacity of the single image line corresponds to the total storage capacity of three line buffers.

TABLE 4

IMAGE WITH THREE TIMES THE SIZE OF STANDARD IMAGE: PATTERN A

| | NUMBER OF IMAGE LINES NECESSARY FOR PROCESSING | NUMBER OF LINE BUFFERS TO BE ALLOCATED | IMAGE PROCESSING APPLICABILITY |
|---|---|---|---|
| FIRST IMAGE PROCESSING PART 2-1 | 1 | 3 × 1 = 3 | APPLICABLE |
| SECOND IMAGE PROCESSING PART 2-2 | 2 | 3 × 2 = 6 | APPLICABLE |
| THIRD IMAGE PROCESSING PART 2-3 | 2 | 0 × 2 = 0 | NA (SKIP) |
| FOURTH IMAGE PROCESSING PART 2-4 | 3 | 0 × 3 = 0 | NA (SKIP) |
| FIFTH IMAGE PROCESSING PART 2-5 | 2 | 0 × 2 = 0 | NA (SKIP) |

NA: NOT APPLICABLE

As is apparent from the allocation pattern A shown in Table 4, the first image processing part 2-1 needs image data of 24 KB corresponding to a single image line and the second image processing part 2-2 needs image data of 48 KB corresponding to two image lines. In order to provide the first image processing part 2-1 and the second image processing part 2-2 with image data accordingly to the necessary number of image lines, nine out of ten line buffers in a first image processing circuit 70-1 according to the fourth embodiment of the present invention are allocated. Therefore, it is possible to realize image processing tasks (i.e. gain adjustment and filtering of the 3×3 matrix) in the first image processing part 2-1 and in the second image processing part 2-2 with respect to the image having the image line capacity up to 24 KB by the single LSI, onto which the first image processing circuit 70-1 according to the present invention is mounted. In order to perform the subsequent image processing tasks, it is necessary to provide an additional (second) image processing circuit 70-2 according to the fourth embodiment of the present invention so as to perform the line buffer allocation pattern B as shown in Table 5.

TABLE 5

IMAGE WITH THREE TIMES THE SIZE OF STANDARD IMAGE: PATTERN B

| | NUMBER OF IMAGE LINES NECESSARY FOR PROCESSING | NUMBER OF LINE BUFFERS TO BE ALLOCATED | IMAGE PROCESSING APPLICABILITY |
|---|---|---|---|
| FIRST IMAGE PROCESSING PART 2-1 | 1 | 0 × 1 = 0 | NA (SKIP) |
| SECOND IMAGE PROCESSING PART 2-2 | 2 | 0 × 2 = 0 | NA (SKIP) |

TABLE 5-continued

IMAGE WITH THREE TIMES THE
SIZE OF STANDARD IMAGE: PATTERN B

| | NUMBER OF IMAGE LINES NECESSARY FOR PROCESSING | NUMBER OF LINE BUFFERS TO BE ALLOCATED | IMAGE PROCESSING APPLICABILITY |
|---|---|---|---|
| THIRD IMAGE PROCESSING PART 2-3 | 2 | 3 × 2 = 6 | APPLICABLE |
| FOURTH IMAGE PROCESSING PART 2-4 | 3 | 0 × 3 = 0 | NA (SKIP) |
| FIFTH IMAGE PROCESSING PART 2-5 | 2 | 0 × 2 = 0 | NA (SKIP) |

NA: NOT APPLICABLE

As shown in Table 5, the image processing tasks in the first image processing part 2-1 and the second image processing part 2-2, which are already finished (allocated), are disabled ("not applicable"). By allocating six out of ten line buffers in the second image processing circuit 70-2 according to the fourth embodiment of the present invention to the third image processing part 2-3, it is possible to perform the image processing task (size change) thereof with respect to the image having the image line capacity up to 24 KB by the single LSI, onto which the second image processing circuit 70-2 is mounted. The reason why only the third image processing part 2-3 is applicable and the fourth image processing part 2-4 is not applicable is because after allocating six out of ten line buffers on the second image processing circuit 70-2 to the third image processing part 2-3, not enough line data can be assured for the subsequent image processing task in the fourth image processing part 2-4, which needs 72 KB image data that correspond to the total capacity of nine line buffers. In order to perform the image processing task (noise elimination of the 4×4 matrix) of the fourth image processing part 2-4, it is necessary to provide another additional (third) image processing circuit 70-3 according to the fourth embodiment of the present invention so as to perform the allocation pattern C as shown in Table 6.

TABLE 6

IMAGE WITH THREE TIMES THE SIZE
OF STANDARD IMAGE: PATTERN C

| | NUMBER OF IMAGE LINES NECESSARY FOR PROCESSING | NUMBER OF LINE BUFFERS TO BE ALLOCATED | IMAGE PROCESSING APPLICABILITY |
|---|---|---|---|
| FIRST IMAGE PROCESSING PART 2-1 | 1 | 0 × 1 = 0 | NA (SKIP) |
| SECOND IMAGE PROCESSING PART 2-2 | 2 | 0 × 2 = 0 | NA (SKIP) |
| THIRD IMAGE PROCESSING PART 2-3 | 2 | 0 × 2 = 0 | NA (SKIP) |

TABLE 6-continued

IMAGE WITH THREE TIMES THE SIZE
OF STANDARD IMAGE: PATTERN C

| | NUMBER OF IMAGE LINES NECESSARY FOR PROCESSING | NUMBER OF LINE BUFFERS TO BE ALLOCATED | IMAGE PROCESSING APPLICABILITY |
|---|---|---|---|
| FOURTH IMAGE PROCESSING PART 2-4 | 3 | 3 × 3 = 9 | APPLICABLE |
| FIFTH IMAGE PROCESSING PART 2-5 | 2 | 0 × 2 = 0 | NA (SKIP) |

NA: NOT APPLICABLE

As shown in Table 6, it is possible to realize the image processing task of the fourth image processing part 2-4 with respect to the image having the image line capacity up to 24 KB when the single LSI provided with the third image processing circuit 70-3 according to the fourth embodiment of the present invention is used. Since nine line buffers in the third image processing circuit 70-3 are used in order to realize the image processing task in the forth image processing part 2-4, not enough line buffers are left for the subsequent fifth image processing task in the fifth image processing part 2-5, which needs 48 KB image data that correspond to the total capacity of six line buffers. In order to perform the image processing task (error diffusion of the 3×3 matrix) of the fifth image processing part 2-5, it is necessary to provide a fourth image processing circuit 70-4 so as to perform the allocation pattern D as shown in Table 7.

TABLE 7

IMAGE WITH THREE TIMES THE SIZE OF
STANDARD IMAGE: PATTERN D

| | NUMBER OF IMAGE LINES NECESSARY FOR PROCESSING | NUMBER OF LINE BUFFERS TO BE ALLOCATED | IMAGE PROCESSING APPLICABILITY |
|---|---|---|---|
| FIRST IMAGE PROCESSING PART 2-1 | 1 | 0 × 1 = 0 | NA (SKIP) |
| SECOND IMAGE PROCESSING PART 2-2 | 2 | 0 × 2 = 0 | NA (SKIP) |
| THIRD IMAGE PROCESSING PART 2-3 | 2 | 0 × 2 = 0 | NA (SKIP) |
| FOURTH IMAGE PROCESSING PART 2-4 | 3 | 0 × 3 = 0 | NA (SKIP) |
| FIFTH IMAGE PROCESSING PART 2-5 | 2 | 3 × 2 = 6 | APPLICABLE |

NA: NOT APPLICABLE

As shown in Table 7, it is possible to realize the image processing task (error diffusion of the 3×3 matrix) of the fifth image processing part 2-5 with respect to the image having the image line capacity up to 24 KB when the single LSI provided with the fourth image processing circuit 70-4 according to the fourth embodiment of the present invention is used.

It can be understood from the above description that in order to perform five different image processing tasks in the respective image processing parts with respect to an image having the image line capacity up to 24 KB, four image processing circuits 70-1, 70-2, 70-3, and 70-4 are provided on the single LSI so as to perform the combined four line buffer allocation patterns A, B, C, and D as mentioned above.

The following are descriptions of the fifth embodiment and the sixth embodiment according to the present invention. The fifth and the sixth embodiments of the present invention are application examples of the image processing circuit according to the present invention.

Figure 9A:
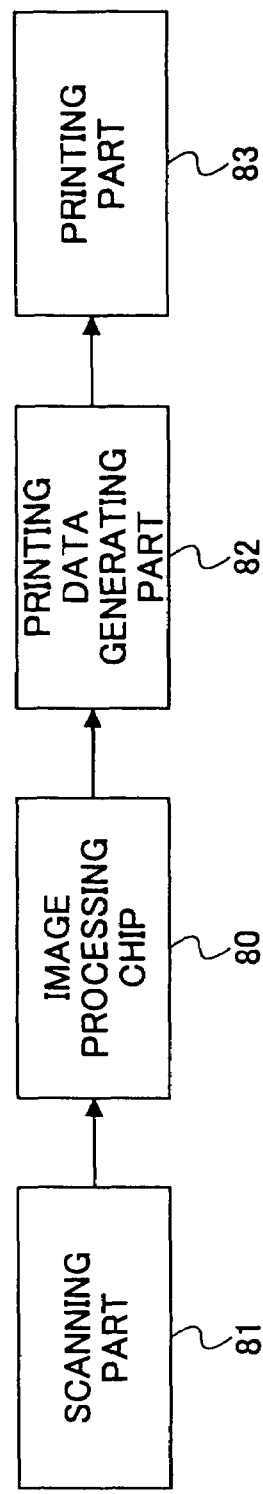
FIG. 9A shows a block diagram illustrating a configuration of a copier as an image forming apparatus according to a fifth embodiment of the present invention.

FIG. 9A shows a block diagram illustrating a configuration of an image forming apparatus, which is a copier in the fifth embodiment of the present invention. The copier is provided with a scanning part 81, an image processing chip 80 that is mounted with the image processing circuit according to the first to the fourth embodiments of the present invention, a printing data generating part 82, and a printing part 83. The scanning part 81 scans a document sheet and generates original image data. The scanning part 81 is provided with an exposure lamp (not shown) that irradiates light beams onto the document sheet, a lens array (not shown) that collects light beams reflected from the document sheet, and a CCD image sensor (not shown) that converts the collected light beams into electric signals.

The image processing chip 80 is a single chip mounted with, for example, the image processing circuit 10 according to the first embodiment of the present invention (FIG. 2), the image processing circuit 40 according to the second embodiment of the present invention (FIG. 5), the combined image processing circuit 60 according to the third embodiment of the present invention (FIG. 7), or the image processing circuit 70 according to the fourth embodiment of the present invention (FIG. 8). The image processing chip 80 receives the original image data from the scanning part 81 and provides the processed image data after processing by the image processing circuit. Illustrative examples of the image processing are described in accordance with the first to the fourth embodiments of the present invention, and therefore the descriptions of which are omitted.

The printing data generating part 82 performs processing for a printing output, such as a tone correction (γ correction) in accordance with a tone characteristic of a photoconductor with respect to the processed image data provided from the image processing chip 80. The printing data generating part 82 further generates signals for driving a laser diode based on the tone corrected image data. The laser diode driving signals are provided as printing data. The printing part 83 receives the printing data from the printing data generating part 82 and prints based on the received printing data. In particular, the printing part 83 makes the semiconductor laser emit a light beam based on the printing data. The laser light emitted from the semiconductor laser is irradiated onto the electrically charged and rotationally driven photoconductor so as to form electrostatic latent images. The electrostatic latent images on the photoconductor are developed by toner and the developed images are transferred onto the transfer paper wound around a transfer drum.

Figure 9B:
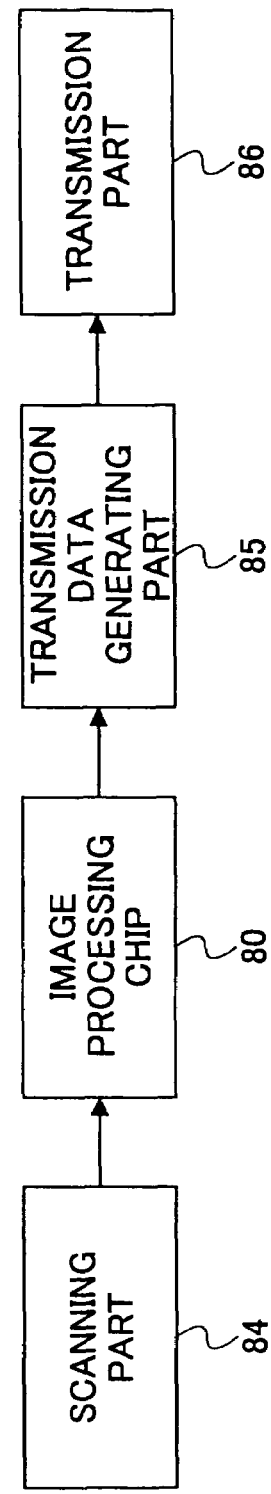
FIG. 9B shows a block diagram illustrating a configuration of a facsimile machine as an image forming apparatus according to a sixth embodiment of the present invention.

FIG. 9B is a block diagram illustrating a configuration of an image forming apparatus, which is a facsimile machine in the sixth embodiment of the present invention. The facsimile machine is provided with a scanning part 84, an image processing chip 80, a transmission data generating part 85, and a transmission part 86. The difference between the copier shown in FIG. 9A and the facsimile machine shown in FIG. 9B is that the printing data generating part 85 and the printing part 83 of the copier are replaced by the transmission data generating part 85 and the transmission part 86, respectively, of the facsimile machine. The description is only given for such differences. The transmission data generating part 85 receives processed image data provided from the image processing chip 80 and performs data processing that complies with a predetermined standard for sending a facsimile, such as redundancy suppressing coding including Modified Huffman (MH) coding and Modified READ (MR) coding, etc. The transmission data generating part 85 provides the processed data to the transmission part 86 as transmission data. The transmission part 86 sends the received transmission data to a counterpart receiving the transmission data through analog/digital signal lines.

Further, the present invention is not limited to these embodiments, and variations and modifications may be made without departing from the scope of the present invention.

The present application is based on Japanese priority application No. 2002-053734 filed on Feb. 28, 2002, the entire contents of which are hereby incorporated by reference.

What is claimed is:

1. An image processing circuit comprising:
a plurality of line buffers, each line buffer storing pixel data of a plurality of pixels as line data, said plurality of pixels configuring a single image line of an image;
a first image processing part performing a first image processing task on original image data provided from the exterior by using the line data stored in at least one of said plurality of line buffers, and providing processed image data;
a second image processing part performing a second image processing task on the processed image data provided from said first image processing part by using the line data stored in at least one of said plurality of line buffers, and providing processed image data;
a line buffer selector that selectively connects said first image processing part to a first subset of said plurality of line buffers and selectively connects said second image processing part to a second subset of said plurality of line buffers, said first subset of said plurality of line buffers not overlapping with said second subset of said plurality of line buffers; and
an output path selector that selects one of an output path that skips the second image processing task and an output path that performs the second image processing task, wherein said output path selector selects said output path that skips the second image processing task when said line buffer selector connects said first image processing part to all of said plurality of line buffers provided in the image processing circuit, and said output path selector selects said output path that performs the second image processing task when said line buffer selector connects said second image processing part to a predetermined number of line buffers that are necessary for the second image processing tasks,
wherein the first image processing part and the second image processing part are identical in structure.

2. The image processing circuit as claimed in claim 1, wherein:
the number of line buffers connected to said first image processing part indicates the number of image lines necessary for the first image processing task; and the number of line buffers connected to said second image processing part indicates the number of image lines necessary for the second image processing task.

3. The image processing circuit of claim 1, wherein the first image processing part and the second image processing part simultaneously perform said first image processing task and said second image processing task, respectively.

4. The image processing circuit as claimed in claim 1, wherein said output path selector is configured to select any one of the output path that skips the second image processing task, the output path that performs the second image processing task, and an output path that performs the first image processing task and the second image processing task.

5. An image processing circuit comprising:
a plurality of line buffers, each line buffer storing pixel data of a plurality of pixels as line data, said plurality of pixels configuring a single image line of an image;
a first image processing part performing a first image processing task on original image data provided from the exterior by using the line data stored in at least one of said plurality of line buffers, and providing processed image data;
a second image processing part performing a second image processing task on the processed image data provided from said first image processing part by using the line data stored in at least one of said plurality of line buffers, and providing processed image data;
a line buffer selector that selectively connects said first image processing part to a first subset of said plurality of line buffers and selectively connects said second image processing part to a second subset of said plurality of line buffers, said first subset of said plurality of line buffers not overlapping with said second subset of said plurality of line buffers;
a first output path selector that selects one of an output path that skips the first image processing task and an output path that performs the first image processing task; and
a second output path selector that selects one of an output path that skips the second image processing task and an output path that performs the second image processing task,
wherein said second output path selector selects said output path that skips the second image processing task when said lint buffer selector connects said first image processing part to all of said plurality of line buffers provided in the image processing circuit, and said output path selector selects said output path that performs the second image processing task when said line buffer selector connects said second image processing part to a predetermined number of line buffers that are necessary for the second image processing task,
wherein the first image processing part and the second image processing part are identical in structure.

6. The image processing circuit as claimed in claim 5, wherein:
the number of line buffers connected to said first image processing part indicates the number of image lines necessary for the first image processing task; and
the number of line buffers connected to said second image processing part indicates the number or image lines necessary for the second image processing task.

7. The image processing circuit of claim 5, wherein the first image processing part and the second image processing part simultaneously perform said first image processing task and said second image processing task, respectively.

8. A combined image processing circuit comprising:
a first image processing circuit and a second image processing circuit serially connected to one another, each image processing circuit comprising:
a plurality of line buffers, each line buffer storing pixel data of a plurality of pixels as line data, said plurality of pixels configuring a single image line of an image;
a first image processing part performing a first image processing task on original image data provided from the exterior by using the line data stored in at least one of said plurality of line buffers, and providing processed image data;
a second image processing part performing a second image processing task on the processed image data provided from said first image processing part by using the line data stored in at least one of said plurality of line buffers, and providing processed image data;
a line buffer selector that selectively connects said first image processing part and said second image processing part to any number of line buffers among said plurality of line buffers;
a first output path selector that selects one of an output path that skips the first image processing task and an output path that performs the first image processing task; and
a second output path selector that selects one of an output path that skips the second image processing task and an output path that performs the second image processing task,
wherein said second output path selector selects said output path that skips the second image processing task when said line buffer selector connects said first image processing part to a predetermined number of line buffers, and
wherein the first image processing circuit and the second image processing circuit are identical in structure.

9. The combined image processing circuit as claimed in claim 8, wherein:
the number of line buffers connected to said first image processing part indicates the number of image lines necessary for the first image processing task; and
the number of line buffers connected to said second image processing part indicates the number of image lines necessary for the second image processing task.

10. The combined image processing circuit as claimed in claim 8, wherein the line data used by the first image processing part for said first image processing task are from a first subset of said plurality of line buffers, and the line data used by the second image processing part for said second image processing task are from a second subset of said plurality of line buffers different from said first subset.

11. The combined image processing circuit of claim 10, wherein the first image processing part and the second image processing part simultaneously perform said first image processing task and said second image processing task, respectively.

12. A combined image processing circuit comprising:
a first image processing circuit and a second image processing circuit serially connected to one another, each image processing circuit comprising:
a plurality of line buffers, each line buffer storing pixel data of a plurality of pixels as line data, said plurality of pixels configuring a single image line of an image;

a first image processing part performing a first image processing task on original image data provided from the exterior by using the line data stored in at least one of said plurality of line buffers, and providing processed image data;

a second image processing part performing a second image processing task on the processed image data provided from said first image processing part by using the line data stored in at least one of said plurality of line buffers, and providing processed image data;

a line buffer selector that selectively connects said first image processing part and said second image processing part to any number of line buffers among said plurality of line buffers, wherein the first image processing circuit and the second image processing circuit are identical in structure.

13. The combined image processing circuit as claimed in claim 12, wherein:

the number of line buffers connected to said first image processing part indicates the number of image lines necessary for the first image processing task; and the number of line buffers connected to said second image processing part indicates the number of image lines necessary for the second image processing task.

14. The combined image processing circuit as claimed in claim 12, wherein the line data used by the first image processing part for said first image processing task are from a first subset of said plurality of line buffers, and the line data used by the second image processing part for said second image processing task are from a second subset of said plurality of line buffers different from said first subset.

* * * * *